May 2, 1950 K. M. WATSON 2,506,123
APPARATUS FOR PYROLYTIC CONVERSION OF HYDROCARBONS
Filed June 27, 1947
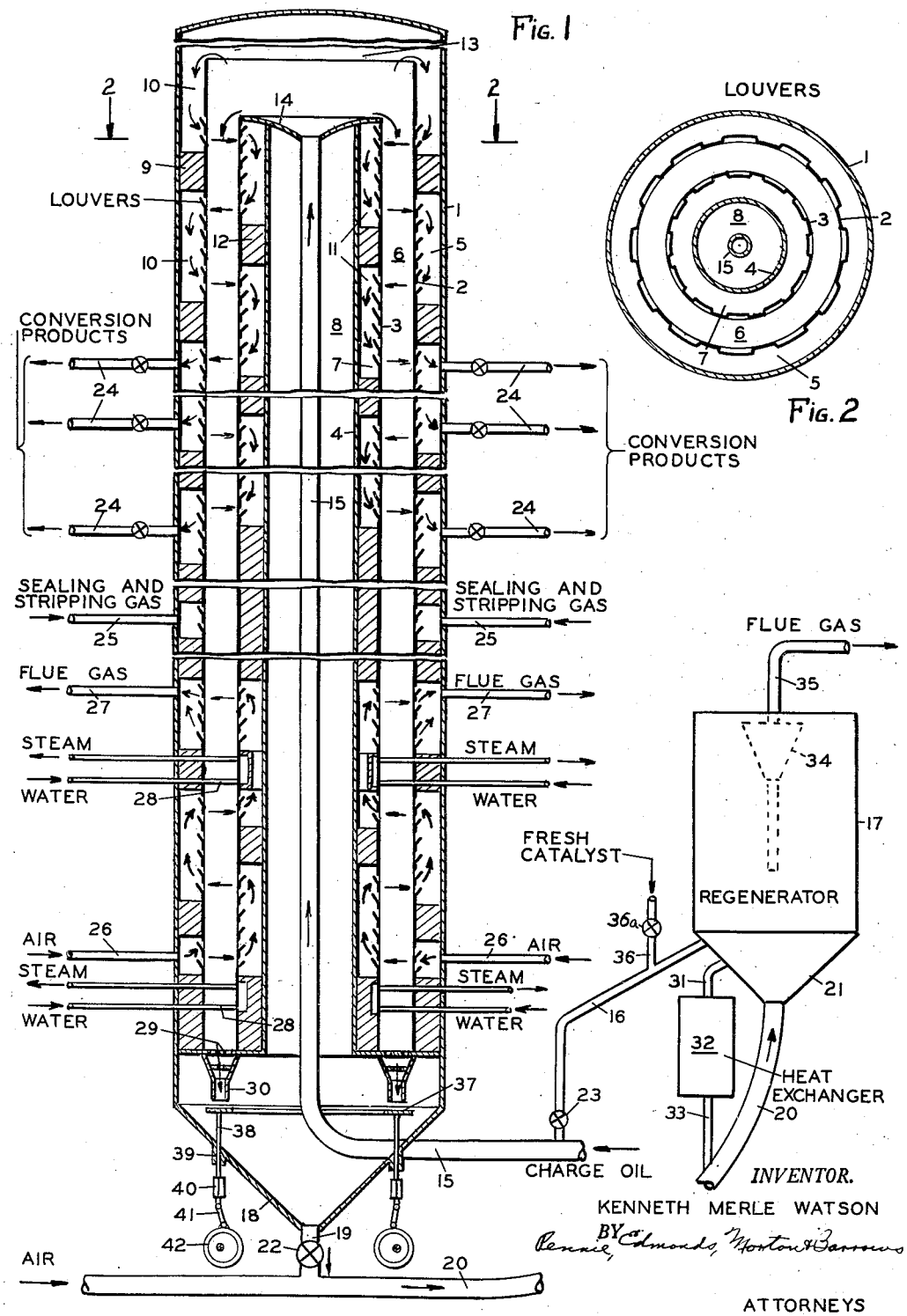
INVENTOR.
KENNETH MERLE WATSON
BY
ATTORNEYS Patented May 2, 1950

2,506,123

UNITED STATES PATENT OFFICE 2,506,123

APPARATUS FOR PYROLYTIC CONVERSION OF HYDROCARBONS

Kenneth Merle Watson, Madison, Wis., assignor to Sinclair Refining Company, New York, N. Y., a corporation of Maine Application June 27, 1947, Serial No. 757,647

3 Claims. (Cl. 23—288)

This invention relates to the pyrolytic conversion of hydrocarbons and provides an improved apparatus especially adapted to the carrying out of such pyrolytic conversion processes involving the use of a solid catalyst.

In such operations, a carbonaceous deposit is formed on the solid catalyst during the hydrocarbon conversion and the catalyst must be periodically regenerated to restore its catalytic effectiveness.

In one method of operation previously proposed, the hydrocarbon to be converted is passed continuously upwardly through a downwardly gravitating bed of catalyst, in granular or pelleted form, in a vertically elongated conversion chamber of large transverse dimension, the catalyst being continuously withdrawn from the lower end of the chamber, regenerated, and returned to the upper end of the chamber. The regeneration is effected by burning off the carbonaceous deposit by passing the hot catalyst downwardly through a similar vertically elongated chamber countercurrent to a stream of air.

Such operations have entailed expensive and troublesome mechanical elevator means for conveying the catalyst from the lower end of the conversion chamber to the top of the regenerating chamber and again from the lower end of the regenerating chamber to the top of the conversion chamber. Difficulties have also been experienced in effecting uniform contact between the hydrocarbon vapors and the catalyst by reason of the tendency of the vapors to channel upwardly through the bed of catalyst. Similar difficulties have been experienced in the regeneration of the catalyst. The present invention provides an improved apparatus whereby these difficulties are avoided.

The apparatus of my present invention is especially adapted to the carrying out of the process described and claimed in my copending application Serial No. 757,640, filed concurrently herewith according to which the catalyst at an elevated temperature is caused to gravitate as a continuous, vertically elongated bed, or column, downwardly through a vertically elongated chamber having at least one relatively narrow horizontal dimension. The conversion reaction, and also a substantial amount of regeneration of the catalyst, are successively effected in this single elongated body of catalyst. The catalyst is passed from the bottom of the column to a regenerating chamber wherein residual carbon is burned from the catalyst, and also any catalyst fines formed by attrition are separated from the catalyst, by blowing with additional air.

The hot regenerated catalyst is passed from the regenerating chamber into a stream of hydrocarbon vapors to be processed and is caught up by the vapors and carried in suspension upwardly into an enlarged chamber, positioned at an elevation higher than the upper end of the elongated chamber, and in which the catalyst drops out of suspension and flows therefrom by gravity onto the upper end of the vertically elongated catalyst bed.

According to a method of operation specifically described in said application, the hydrocarbon vapors separated from the catalyst pass from the enlarged chamber and are repeatedly passed back and forth through the upper portion of the hot catalyst bed, at progressively different elevations, whereby conversion of the hydrocarbons is effected with the resultant deposition of carbonaceous material on the catalyst. Air, or other oxidizing gas, is similarly passed back and forth through the lower portion of the hot catalyst bed at progressively different elevations, with a resultant burning off from the catalyst of a substantial portion of the carbonaceous deposit.

The hot, partially regenerated catalyst, as previously noted, is withdrawn from the lower portion of the vertically elongated chamber, suspended in a gaseous carrying medium, advantageously air, and carried in suspension to the separate regenerating chamber, wherein residual carbon is burned from the catalyst by contact with air and from which the regenerated catalyst is returned to the vertically elongated catalyst bed, as just noted. Heat for effecting the conversion is supplied, in large measure, by the burning of the carbonaceous deposit. Additional heat may be supplied where required by preheating the hydrocarbon charge oil vapors.

Catalyst fines formed by attrition during the cycling of the catalyst are carried off from the cycle in suspension in flue gases passing from the zone of final regeneration.

The hydrocarbon vapors to be converted may be passed through the catalyst bed, at progressively higher or progressively lower levels, that is, in a generally countercurrent or generally concurrent direction with respect to the direction of the catalyst flow. Similarly, air for use in the partial regeneration of the catalyst may be passed through the lower portion of the catalyst bed at progressively higher or progressively lower levels. Due precaution should be taken, however, to minimize intermixing of regeneration gases and hydrocarbon vapors.

The effecting of the regeneration of the catalyst in stages, as just described, provides a particularly advantageous method of removing catalyst fines from the cycle, and a very complete and uniform regeneration of the catalyst is effected. Further, means are provided whereby excess air may be passed in contact with the catalyst in the final regeneration, to insure complete removal of carbonaceous deposit, without danger of excess oxygen becoming admixed with the hydrocarbon vapors.

In a particularly advantageous method of operation in accordance with my invention, the hydrocarbon vapors are repeatedly passed through the column of catalyst, at progressively lower levels in the upper portion of the catalyst bed, and the regeneration air is passed through the catalyst, at progressively higher levels in the lower portion of the catalyst bed. By this procedure, a zone of low pressure is created at the intermediate portion of the bed, both with respect to the hydrocarbon vapors, and the gaseous products of the combustion, and the tendency of the gases and vapors to become intermixed is minimized.

It is also particularly advantageous to inject an inert sealing, or stripping, gas into the zone intermediate the conversion and regenerating sections. This serves, further, to prevent mixing of combustion gases and hydrocarbon vapors and also serves as a stripping medium for stripping from the spent catalyst readily vaporizable hydrocarbons.

A large amount of heat is liberated in the burning of the carbonaceous deposit and care should be exercised to avoid over-heating the catalyst. It is usually advantageous to extract heat from the beds of catalyst undergoing regeneration in an amount sufficient to avoid excess temperatures. For this purpose, cooling coils are, with advantage, provided in the regenerating zone of the vertically elongated chamber adapted to the passage of water, or other cooling fluid therethrough. Also, a portion of the catalyst may be withdrawn from the bed of catalyst undergoing final regeneration, cooled by passing through a waste heat boiler, or the like, and returned to the final regenerating zone.

By proper control of the rate of downward flow of the catalyst bed and coordinating therewith the rate of flow and number of passes of the hydrocarbon vapors and regenerating air therethrough, the catalyst will be substantially spent and ready for regeneration by the time it reaches the lower end of the reaction zone and a major portion of the carbonaceous deposit formed thereon will be burned off upon reaching the lower end of the regenerating zone of the catalyst column.

The optimum rate of downward flow of the catalyst bed will depend primarily upon the type of catalyst employed, the type of hydrocarbon being converted, operating temperatures, the rate of hydrocarbon feed, the extent of the required reaction, the depth of cracking, for instance, the number of passes through the catalyst and the thickness of the catalyst bed. The optimum rate of catalyst flow for any particular operation is readily determinable by simple tests and is, with advantage, controlled by regulation of flow of catalyst from the lower end of the regenerating zone by means of a suitable valve arrangement. By effecting the final regeneration of the catalyst in a separate chamber, as just described, the regeneration of the catalyst may be controlled independently of the rate of downward flow of the vertically elongated catalyst bed.

The apparatus is applicable to various types of hydrocarbon conversion and is adapted to the use of various solid catalysts in granular or pelleted form. The invention will be more particularly described and illustrated with reference to the accompanying drawing of which:

Figure 1 is a somewhat fragmentary vertical, sectional view, and

Figure 2 is a transverse section along the line 2—2 of Figure 1.

The part indicated by the reference numeral 1 is a cylindrical casing, advantageously of sheet metal, enclosed at its upper end. Coaxially positioned in casing 1 are cylindrical casings 2, 3, and 4 of progressively smaller diameters which, together with the outer casing, form annular chambers 5, 6 and 7 and an interior cylindrical portion 8. The intermediate annulus 6 is substantially unobstructed for its entire height. The outer annulus 5 is completely obstructed by a plurality of vertically spaced partitions 9 of considerable depth, forming a plurality of vertically spaced chambers 10. The inner annulus 7 is similarly divided into a plurality of vertically spaced chambers 11 by similar partitions or spacers 12.

Each of the chambers 10 and 11 is connected with the annulus 6 through louvers, the slats of which project upwardly and outwardly from the annulus 6 into the respective chambers.

The casings 2, 3 and 4 terminate short of the upper end of the cylinder formed by casing 1 so as to form a large cylindrical chamber 13 in the upper portion of the apparatus. The uppermost of chambers 10 is in open communication at its upper end with chamber 13. The annulus 6 is likewise, in open communication at its upper end with chamber 13. The upper end of the uppermost chamber 11 and the upper end of the inner cylinder 8 are closed off from chamber 13 by partition 14. An elevator conduit 15 extends upwardly through the inner chamber 8 and leads into chamber 13 through an opening in partition 14. The lower end of elevator conduit 15 is connected with a source of vaporized charge oil, not shown, and also through conduit 16 with the lower portion of a regenerator 17, which regenerator may be of conventional type.

The lower end of annulus 6 opens into a conical hopper member 18, the lower ends of which are connected by conduit 19 with conduit 20 which is, in turn, connected with the lower end of conical member 21 forming the lower portion of the regenerator 17.

The conduits 19 may be provided with valves 22, which may be of conventional type, advantageously a conventional slide valve, for regulating and controlling the flow of catalyst through conduits 19.

The spacers, or partitions 9 and 12 are, with advantage positioned somewhat as shown in the drawing so as to form chambers 10 and 11 in staggered positions such that the lower end of a given chamber 10 is directly opposite the upper end of the next lower chamber 11 and the lower end of said chamber 11 is directly opposite the upper end of the next lower chamber 10. The spacers 9 and 12 are, for clarity, shown in the drawing as solid sections, but it is to be understood that they may be either solid or hollow. Further, for reduction in weight and in material used in fabrication, the respective casings 1 and 4 may be discontinuous at the points of the respective spacers.

In operation, the annulus 6 is filled with granular catalyst, for instance, by charging the catalyst through an opening, not shown, in the top of the apparatus, adapted to be sealed in operation. Vaporized hydrocarbon oil to be processed is charged through line 15 in which it picks up in suspension, catalyst passing downwardly from the regenerator 17 through conduit 16 at a rate controlled by adjustable valves 23. The hydrocarbon vapors carrying the catalyst in suspension pass upwardly through the elevator conduit 15 into chamber 13 wherein the catalyst drops out of suspension by reason of decreased velocity of the vapors and falls onto a bed of catalyst maintained in chamber 13 from which the catalyst flows into the annulus 6, keeping it continuously filled with the catalyst.

Separated hydrocarbon vapors pass from chamber 13 into the upper end of the uppermost chamber 10, and, from thence, the vapors pass, by way of the louvers, through the bed of catalyst in annulus 6 and into the upper end of the uppermost chamber 11. From the lower portion of said chamber 11, the vapors pass back through the body of catalyst into the next lower chamber 10, and so back and forth through the body of catalyst, at progressively lower levels, until the vapors reach an intermediate chamber 10 from which they are withdrawn through one of the valved lines 24 to a fractionating apparatus, not shown. In the drawing, a plurality of conversion product draw-off lines 24 are shown leading from progressively lower chambers 10. This is advantageous as it permits withdrawal of conversion products at selective levels from the reaction zone thereby varying the space velocities of the operation and also varying the depth of the intermediate sealing and stripping zone, subsequently described.

The catalyst which has been substantially spent continues downwardly through annulus 6 and is stripped of readily vaporizable hydrocarbons remaining thereon by a stripping gas or vapor, steam, for instance, introduced into a still lower chamber 10 through lines 25.

Air is passed into the lowermost chamber 10 through lines 26, flows therefrom by way of the louvers, through the bed of catalyst into the lowermost chamber 11 and back through the catalyst into the next higher chamber 10, and so back and forth through the catalyst, at progressively higher levels, until it reaches an intermediate chamber 10, below that into which the stripping medium is injected, and the flue gases pass therefrom through conduits 27 to a stack, not shown in the drawing.

The air passing in contact with the hot catalyst results in the burning of the major portion of the carbonaceous deposit formed on the catalyst during the hydrocarbon conversion. Excess heat is extracted from the catalyst undergoing regeneration by means of cooling coils 28, extending through the bed of catalyst in annulus 6 and through which a cooling medium is circulated. For instance, water may be circulated through the cooling coils and thereby converted into steam. Any number of cooling coils may be used to extract from the catalyst an amount of heat necessary to prevent excessive temperatures.

The partially regenerated catalyst passes from the lower end of the regenerating zone through perforations in a series of distributing plates 29 so positioned as to permit the flow of catalyst therethrough at a retarded rate, dependent upon the angle of repose of the catalyst, and also to retard the passage of air upwardly therethrough from conduit 20, as understood by the art. From thence, the catalyst flows through the annular connection 30 into hopper 18 and through the conduits 19 into the stream of air passing through conduit 20 and is carried thereby in suspension upwardly into the regenerator 17.

The regenerator 17 may be of conventional type and may be provided with means for cooling the body of catalyst undergoing regeneration by continuously withdrawing a portion thereof through conduit 31, cooler 32, advantageously a waste heat boiler and conduit 33 into the stream of air passing to the regenerator 17 through conduit 20, and is returned to the regenerator 17 in suspension in the air, together with partially regenerated catalyst from the annulus 6.

Residual carbon is burned from the catalyst in the regenerator 17 and the products of combustion pass from the upper end through cyclone type separator 34, for the separation of coarser particles of suspended catalyst, which are returned to the dense phase body of catalyst in the chamber, and the products of combustion passed therefrom carrying catalyst fines in suspension through conduit 35 to a precipitator or stack, not shown in the drawing. Fresh catalyst may be supplied as required during operation through conduit 36 at a rate controlled by valve 36a.

The rate of flow of the catalyst from the lower end of catalyst bed in annulus 6 may also be controlled and regulated, in conjunction with plates 29 and valve 22, or in lieu thereof, by means of a valve arrangement positioned just below the annular connection 30. This valve mechanism comprises an annular flat ring member 37 of somewhat greater width than the annulus 30, positioned directly below and spaced from the lower end thereof. The ring 37 is adjustably supported by a plurality of shafts 38 extending downwardly through the wall of hopper 18 and sealed by suitable glands 39. The length of the shafts 38 may be adjusted by means of turn buckles 40 and the lower ends of the shafts are connected by linkages 41 to eccentrics 42. The eccentrics 42 are connected by suitable means, not shown, so that they will operate together to impart an oscillatory motion to ring 37, adjustments in level of ring 37 and of its distance from the lower end of annulus 30 being made by the turn buckles 40.

In the valve arrangement shown, the ring 37 will completely shut off the flow of catalyst without requiring mechanical sealing of the valve. By raising the ring to a point where its edges intercept the angle of repose of the catalyst flowing from annulus 30, flow is completely stopped. This method of flow control is particularly advantageous as it avoids crushing the catalyst. The rate of catalyst flow is determined by the height of the ring and the oscillatory motion maintains uniform flow at all points around the annulus 30.

The thickness of the annulus 6 may be varied over a considerable range, the optimum thickness depending upon other operating conditions. Generally, its thickness is, with advantage about 1 to 2 feet. The depth of the spacers 9 and 12 is, with advantage, somewhat greater than the thickness of the bed of catalyst in annulus 6 so as to minimize any tendency of the gases or vapors to pass directly from one chamber to that immediately above or below it rather than through the catalyst bed to the opposite chamber.

The vertical spacing between the outer and inner annular chambers, respectively, is shown in the drawing as somewhat greater than the thickness of annulus 6. It will be understood that the spacings are, with advantage, of greater relative vertical dimension than shown in the drawing, advantageously being considerably greater than the thickness of the catalyst bed, as previously noted.

With the exception of the intermediate zone, some by-passing of the gases or vapors from one zone to the next higher or lower zone does not seriously interfere with the operation. However, mixing of combustion gases from the regenerating zone with the hydrocarbon vapors should usually be avoided and, for this reason, it is particularly advantageous that the spacing just above the regenerating zone be considerably greater than the path horizontally through the catalyst bed.

The apparatus specifically shown in the drawing provides for four to six passes of the hydrocarbon vapors and for four passes of the regenerating air through the catalyst bed. Frequently, a greater number of passes is desirable and is within the contemplation of my invention. Figure 1 of the drawings is somewhat fragmentary indicating intervening sections of the apparatus of similar design.

Provision for the injection of sealing or stripping gas between the conversion and regenerating zones may frequently be omitted, particularly where the amount of air passed through the regenerating zone is so controlled that upon reaching the upper end of the regenerating zone, the combustion gases are substantially free from uncombined oxygen. Under such conditions, the hot inert combustion products will serve to strip the spent catalyst and a portion of the combustion gases may be caused to pass upwardly through the stripping zone into the conversion zone by imposing a slight back pressure on the effluent flue gases.

The elevator conduit 15 is, with advantage, of such diameter relative to the volume of hydrocarbon vapors to be charged therethrough as to effect a high velocity of flow so as to entrain the catalyst particles and carry them upwardly into chamber 13. Generally, the superficial velocity of the rising vapors should be within the range of 10 to 50 feet per second, the optimum velocity depending, in large measure, upon the size and density of the catalyst particles and the relative proportion of catalyst to be carried thereby.

The apparatus of the invention is adapted to the use of various types of catalyst, for instance, natural or synthetic earths, silica gel, and the like, or various inert carriers having active catalysts deposited thereon. The size of the particles of catalyst is, with advantage, of a mesh within the range of 25 to 40, though catalysts of larger or smaller particle size may be employed. Pelleted catalyst as coarse as 4 to 10 mesh may be employed with advantage. Usually, powdered catalyst, such as used in the fluid catalyst processes, is less desirable because of a tendency of the catalyst particles to be carried out of the catalyst bed along with the gases and vapors, but may be used in conjunction with relative low gas and vapor velocities through the catalyst bed.

Operating conditions are generally subject to considerable variation depending upon the particular catalyst employed, and the nature and the extent of the desired reaction. In cracking gas oil, for instance, using a silica-alumina type catalyst, the temperature of the reaction zone is, with advantage, maintained within the range of about 750 to 950° F. and the pressure within the range of about 10 to 15 pounds per square inch. In the regenerating zones, a temperature within the range of 900 to 1150° F. is usually satisfactory.

The temperature in the reaction zone is controlled in large measure at least by the temperature of the catalyst and the proportion thereof introduced into the charge oil and also the extent of preheat of the charge oil. The temperature of the catalyst undergoing regeneration is controlled by the extraction of heat therefrom, as previously described, any desired number of cooling coils being used for that purpose in the regenerating zone of annulus 6 and any number of coolers or waste heat boilers being used in connection with the final regeneration in regenerator 17.

By use of the present apparatus the extent of contact between the catalyst and the hydrocarbon vapors being converted and also the catalytic activity of the catalyst with which the hydrocarbon vapors are brought into contact may be maintained extremely uniform. Further, an exceptionally uniform and complete regeneration of the catalyst is attained and the catalyst is effectively freed from catalyst fines in the final regenerating step. The use of the present apparatus in carrying out such conversion operations has the advantage of high uniformity of the product, increased catalyst life and catalytic effectiveness, increased economy of operation, by reason of the elimination of mechanical conveyors, and also an exceptionally close control of operating conditions.

I claim:

1. Apparatus especially adapted to the conversion of hydrocarbons which comprises an enlarged elevated chamber, a coaxially positioned, vertically elongated, annular chamber extending downwardly therefrom, a plurality of outer, vertically spaced annular chambers, encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respective vertically spaced chambers, a hopper beneath the lower end of the vertically elongated chamber and communicating therewith through an annular connection, a separate chamber adapted to contain a body of finely divided solid at an elevated temperature, a conduit leading to the separate chamber, a connection for injecting a gas communicating with the last said conduit, a conduit connecting the lower end of the hopper with the last said conduit at a point downstream from where the last said connection communicates therewith, a conduit leading upwardly to the lower end of the enlarged elevated chamber, a connection for injecting reactant vapors communicating with the lower end of the last said conduit, a conduit connecting the separate chamber with the lower end of the last said conduit at a point downstream from where the last said connection communicates therewith, conduit connections to the lower and at least two intermediate, vertically spaced outer annular chambers, respectively, and a connection between the upper end of the enlarged elevated chamber and the uppermost of the outer, vertically spaced chambers.

2. Apparatus especially adapted to the conversion of hydrocarbons which comprises an enlarged elevated chamber, a coaxially positioned, vertically elongated, annular chamber extending downwardly therefrom, a plurality of outer, vertically space annular chambers encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respectively vertically spaced chambers, a hopper beneath the lower end of the vertically elongated chamber and communicating therewith through an annular connection, flow control mechanism adapted to control the flow of finely divided solid through the annular connection, a separate chamber adapted to contain a body of finely divided solid at an elevated temperature, a conduit leading to the separate chamber, a connection for injecting a gas communicating with the last said conduit, a conduit connecting the lower end of the hopper with the last said conduit at a point downstream from where the last said connection communicates therewith, a conduit leading upwardly to the lower end of the enlarged elevated chamber, a connection for injecting reactant vapors communicating with the lower end of the last said conduit, a conduit connecting the separate chamber with the lower end of the last said conduit at a point downstream from where the last said connection communicates therewith, conduit connections to the lower end at least two intermediate, vertically spaced outer annular chambers, respectively, and a connection between the upper end of the enlarged elevated chamber and the uppermost of the outer vertically spaced chambers.

3. The apparatus of claim 2 further characterized in that the flow control mechanism comprises a ring positioned in a horizontal plane coaxial with and beneath the annular connection, the ring being at least coextensive with the lower end of the annular connection and adapted to be moved toward and away from the lower end of said annular connection.

KENNETH MERLE WATSON.

No references cited.